United States Patent Office 3,163,069
Patented Dec. 29, 1964

3,163,069
CROPPING MACHINE
Achille Edmon, Satrouville, France, assignor to Societe de Constructions Mecaniques et Aeronautiques de la Mayenne, Paris, France, a French body corporate
Filed Aug. 8, 1961, Ser. No. 130,041
Claims priority, application France, Nov. 26, 1960, 845,148
5 Claims. (Cl. 83—303)

The invention relates to a "flying" cropping machine for cropping off tubes, bars and like objects which issue from a machine (rolling, extruding or other machine) with a continuous movement of translation, the cropping being effected in "flight" during the displacement of the tube to be cropped. In the ensuing description reference will be made to the case of the cropping of a tube for the sake of simplicity.

In most known flying cropping machines the cropping is effected by a rotary saw or the like carried either by a carriage having an alternating movement or by a swinging arm, the alternating or swinging movement being brought into action by a measuring mechanism actuated by the tube or its propelling device, often with the aid of an additional driving force under the control of the measuring mechanism.

These cropping machines have serious drawbacks inherent in alternating movement mechanisms, namely the fact that the reversal of the movement at the end of the travel of the carriage or swinging arm necessitates overcoming the inertia of the parts in motion, which results in vibrations and markedly limits the operational speed and output of the cropping machine. Further, the force necessary for overcoming this inertia often requires the intervention of the aforementioned additional driving force.

The object of the invention is to avoid these drawbacks and to provide a flying cropping machine which is simple and light in construction, capable of a very high output, that is, of supplying sections of tubes, bars or other elements from a continuous tube or bar or other element fed at high speed, requires but little setting and maintenance, and produces cropped elements of uniform length within very fine limits.

Further features and advantages of the invention will be apparent from the ensuing description, with reference to the accompanying drawings to which the invention is in no way limited.

Figure 1:
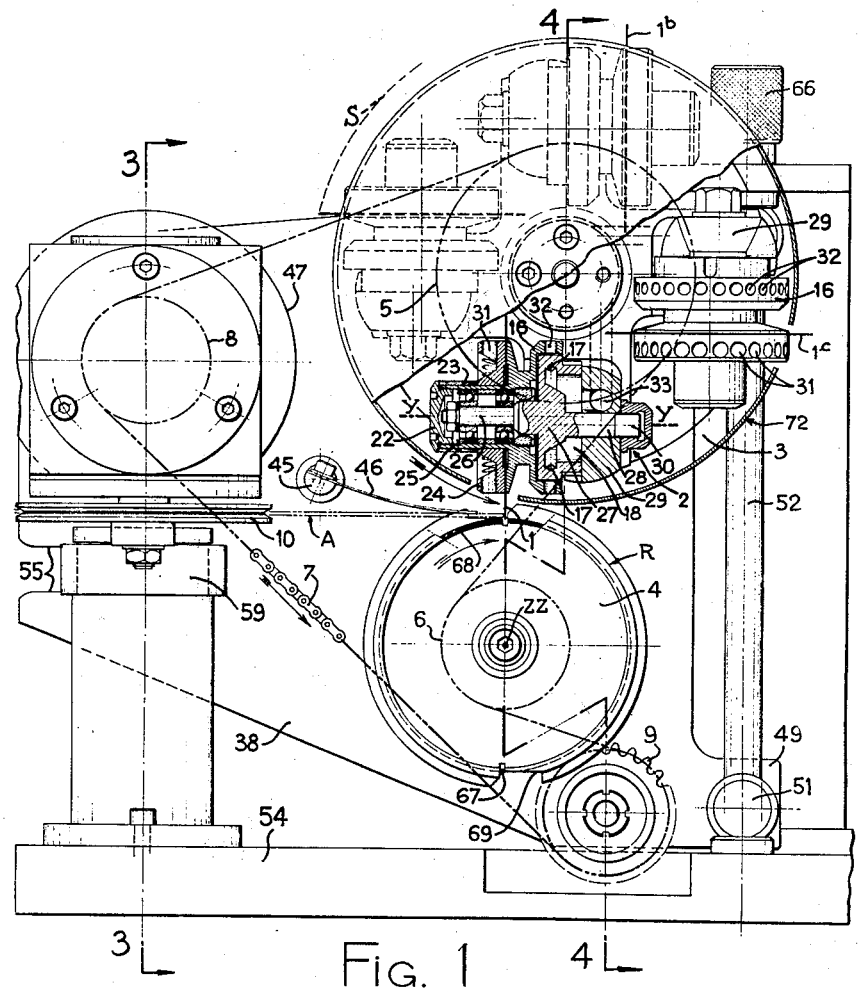
FIG. 1 is an elevational view of a cropping machine according to the invention with a part of the protecting cover removed.

In the illustrated embodiment, the reference character A designates the article to be cropped, for example a flat-shaped tube for the production of radiators, to which is imparted a continuous movement at the output end of a tube shaping machine located on the left side of the cropping machine as viewed in FIG. 1.

The cropping tool is a rotary saw 1 which, together with its drive means 2 (FIG .1), is carried by a rotor 3 which rotates about an axis $x$—$x$ orthogonal to the axis $y$—$y$ of the saw 1. In the illustrated embodiment, for the purpose of achieving a static and dynamic balance of the rotating parts connected to the rotor 3, the latter carries four assemblies spaced at 90° apart, each assembly comprising a rotary saw 1, 1a, 1b and 1c and its drive means.

The geometric cylinder S (FIG. 1) containing the cutting edges of the saw 1, 1a, 1b, 1c intersects a surface of revolution R which guides the tube A to be cropped and is formed on a guide drum 4 which rotates about an axis $z$—$z$ parallel with the axis $x$—$x$.

The rotor 3 is rigid with a chain sprocket 5 and the guide drum rigid with a chain sprocket 6 both driven by a chain 7 which passes round a drive sprocket 8 and a chain tensioning sprocket 9.

The drive sprocket 8 is driven by a reading element which is driven by the tube A at the speed of translation of the latter. In the presently-described embodiment, the reading element consists of a grooved roller 10 frictionally driven by the tube A and keyed on a vertical shaft 11 which drives the shaft 14 of the sprocket 8 through the medium of bevel gears 12 and 13.

The reading roller 10 bears elastically—owing to provision of a device described hereinafter—against the tube A which bears against a support roller 14a keyed on a freely rotative shaft 15.

Each rotary saw, such as the saw 1 (FIG. 1), is rigid with a driving turbine 16 rotated by jets of compressed air expelled by nozzles 17 of a hollow distributor or guide ring 18 in communication with a manifold 19 which is carried by the rotor 3 and communicates with a compressed air inlet 20 extending through the shaft 21 of the rotor.

In the embodiment shown in the drawings, the saw 1 is mounted on a hollow shaft 25 and gripped between, on the one hand, a side member 24 backed by a spacing member 23 and a plug 22 in the shaft 25 and, on the other hand, the turbine rotor 16. This assembly is mounted by means of ball bearings on the shaft 26 of a member 27 which has an eccentric journal 28 extending into a bore in a boss 29 on the rotor 3. The journal 28 terminates in a square-section end 30 the rotation of which permits the setting or regulation of the radial protrusion of the saw 1.

The side member 24 is provided with radial or oblique apertures 31 the walls of which perform the function of the blades of a centrifugal turbine. The power consumed when the apertures 31 put the surrounding air in motion upon rotation of the saw has a braking action adapted to limit the speed of the saw when the latter is caused to rotate freely by the driving turbine 16.

The blades of the driving turbines 16 are, for example, constituted by the walls of radial apertures 32 which open out in alignment with the nozzles 17, the latter extending for example, in a tangential direction in the member 27, or in an oblique direction intermediate of the radius and the tangent, so that the jets of compressed air issuing from these nozzles exert on the blades of the driving turbine 16 a pressure having a tangential component producing a driving torque, as will be clear to a man skilled in the art.

Figures 4, 5:
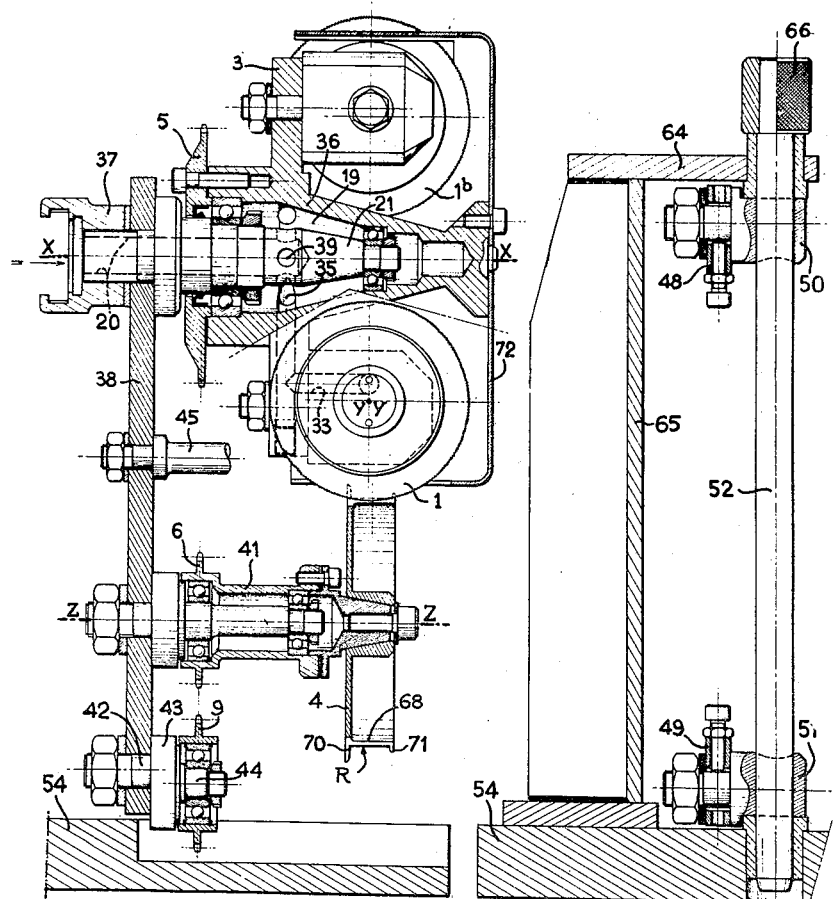
FIG. 4 is a vertical sectional view taken along line 4—4 of FIG. 1.
FIG. 5 is a vertical sectional view taken along line 5—5 of FIG. 2.

The distributor or guide ring 18, defined by the hollowed out part of the member 27 which bears in a fluid-tight manner against the boss 29, communicates by way of a passageway 33 (FIG. 4) with a passageway 35 communicating with the manifold 19 within the hub 36 of the rotor 3. The latter is mounted by means of ball bearings on the fixed shaft 21. The latter is fixed by a screw-threaded end member 37 on a plate 38 and is provided with an axial aperture 20 communicating with the manifold 19 by way of ports 39. The end member 37 acts as a connector for the connection of a compressed air supply pipe.

The plate 38 carrying the shaft 21 of the rotor also carries a fixed shaft 40 on which is mounted a hub 41 of the guide drum 4 and of the sprocket 6, a pin 42 of a disc 43 carrying an eccentric crank pin 44 on which is rotatable the chain tensioning sprocket 9 (rotation of the disc 43 permitting regulation of the tension of the chain 7), a post 45 supporting a spring strip or blade 46 for applying the tube A against the guide drum 4, and a case 47 which guides and protects the shaft 11 of the roller 10, the bevel gears 12, 13 and the shaft 14 of the drive sprocket 8.

Figure 2:
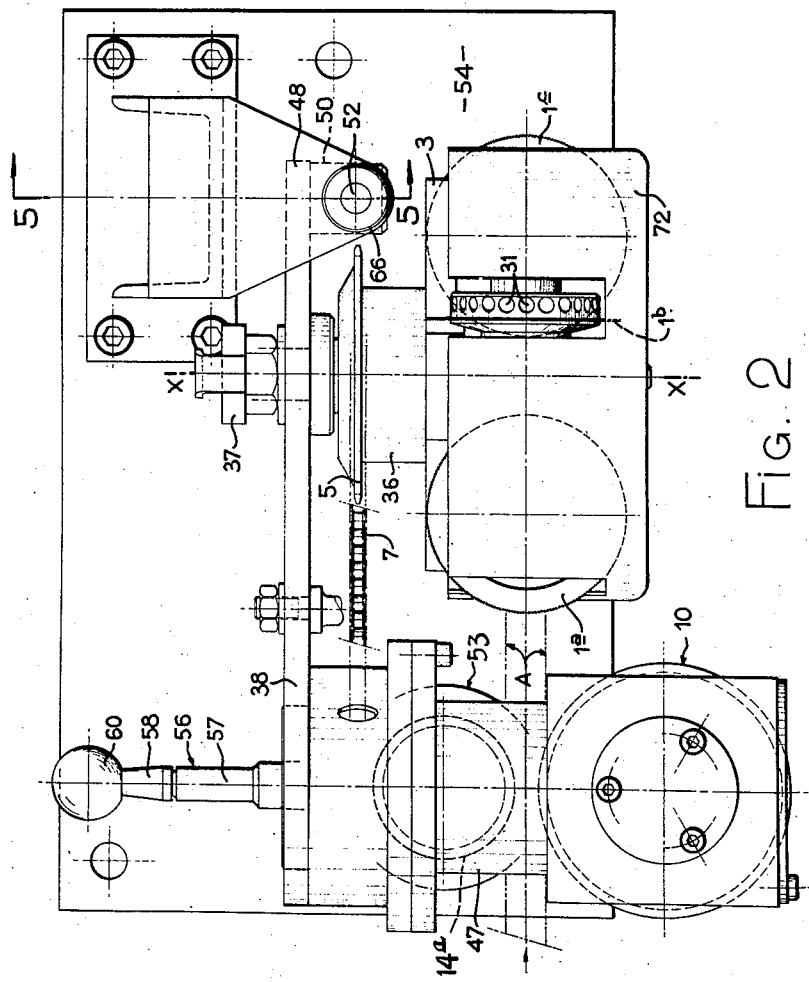
FIG. 2 is a corresponding plan view.

The plate 38 terminates at the right (as viewed in FIG. 1) in an upper branch 48 and a lower branch 49 secured to collars 50, 51 rotatably mounted on a vertical shaft 52, so that this plate and all the devices carried thereby are capable of being swung about the shaft 52. In this swinging movement (see FIG. 2), the reading roller 10 moves toward or away from the support roller 14a whose vertical shaft 15 is rotatable in a support 53 which is fixed, as is the shaft 52, on a fixed stand 54.

Figure 3:
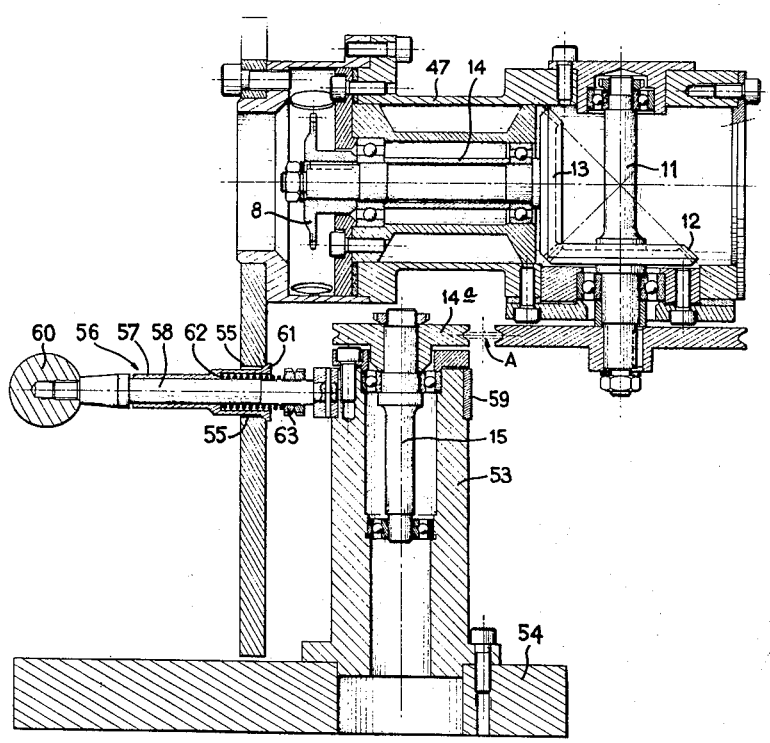
FIG. 3 is a vertical sectional view taken along line 3—3 of FIG. 1.

The plate 38 has a slot 55 (FIG. 1) through which extends a retaining locking means 56 (FIG. 3). This locking means consists of a sleeve 57 slidable on a rod 58 which is rigid with a collar 59 surrounding the support 53 of the roller 14a and terminates in a knob 60. The sleeve 57 has a shoulder 61 which bears against the edges of the slot 55, and a spring 62, disposed in an enlarged portion within the sleeve 57 and bearing against the abutment 63 on the rod, tends to bias the sleeve 57 toward the left as viewed in FIG. 3. Thus the shoulder 61 tends to urge the plate 38 toward the left in causing it to swing about the shaft 52. The roller 10 therefore tends to move toward the support roller 14a and grip the tube A thereby creating the friction required for driving the roller 10 by means of this tube.

The shaft 52 is supported at its lower end in the stand 54 and supported at its upper end by a horizontal branch 64 of a vertical support 65 fixed on the stand 54, and terminates a knurled knob 66. The cross-sectional shape of the guide drum 4, that is, the surface of revolution R (FIG. 4), depends on the cross-sectional shape of the tube A which is a flat-shaped tube in the presently described example. This guide drum is provided at diametrally opposed points with two recesses for receiving in cycles the cutting edge of the rotary saws 1, 1a, 1b and 1c. Each recess (FIG. 1) consists of a radial slot 67 in the rim 68 of the drum and notches 69 in the flanges 70, 71 of the drum, the shapes of the notches being appropriate.

The diameter of the roller 10 and the numbers of teeth on the sprockets 5, 6 and 8 are such that for a rotation through 180° of the roller 10, the rotor 4 effects a quarter of a revolution and the guide drum 4 half a revolution corresponding to a cropping of one tube section. The radius of the geometric cylinder S containing the cutting edges of the saws and that of the guide drum 4 are such that the tangential speeds of the cutting edges of the saws about the axis x—x and the radial slots 67 equal one another and slightly exceed the speed of the tube.

The cropping machine operates in the following manner:

To start up the machine, the locking means 56 is swung so as to disengage it from the recess 55, which allows the plate 38 to be swung in a counterclockwise direction (FIG. 2) separating the reading or measuring roller 10 from the support roller 14a for placing the end of the tube A between these rollers. In putting the locking means 56 back in position, the tube A is elastically gripped between the roller 10 and roller 14a and its continued advance or feed drives the roller 10 in rotation due to the effect of friction. The roller 10 rotates the rotor 3, and the saws 1, 1a, 1b, 1c are rotated continuously by their drive turbines at a speed limiting by the braking turbines.

Owing to the synchronization of the rotation of the rotor 3 with the guide drum 4 and to the choice of the drive ratios, which ensure that each saw penetrates one of the slots 67 in the drum and that the tangential speeds of the cutting edges of the saws about the axis x—x and the drum 4 are equal to or a little greater than the linear speed of the tube A, it will be easily understood that the saws supply the tube A in sections of equal lengths at an output rate which is limited substantially merely by the output of the machine producing the tube.

Most of the parts carried by the rotor and the protecting case 72, which surrounds the latter and is appropriately notched so as to provide free passage of the saws, can be of light alloys and the low inertia of the parts in rotation enables them to respond faithfully to possible variations in the linear speed of the tube A. Further, the mere frictional contact of the reading roller 10 on the tube A is sufficient to rotate the saw-rotor assembly about the axis x—x without slip and without any additional driving force being necessary.

The fact that all the movements are continuous and rotary avoids the serious drawbacks inherent in parts having an alternating or swinging motion.

Although specific embodiments of the invention have been described, many modifications and changes may be made therein without departing from the scope of the invention as defined in the appended claims.

Having now described my invention, what I claim as new and desire to secure by Letters Patent is:

1. A cropping machine for cropping bars and the like fed with a continuous movement of translation, comprising a stand, a rotor having an axis and mounted on said stand for rotation about said axis, a number of cutting units carried by said rotor; each of said units comprising a rotary saw lying in a plane offset from said axis and individual separately fed driving means for driving said saw about an axis orthogonal to said motor axis; a rotary guide having an annular guide face rotatable about an axis parallel with said rotor axis but offset with respect to said rotor axis to be in alignment with each of said saws when the latter are in position to crop the bar, means for engaging and advancing bar for being driven thereby and including a rotatable roller frictionally driven by the bar to be cropped and operatively connected to said rotor and said rotary guide to drive the same in synchronism about their respective axes, said guide having recesses formed in the periphery thereof for receiving the cutting parts of the saws in cycles, the geometric cylinder described by the cutting part of the saws in the rotation of the latter about the axis of rotation of the rotor intersecting the annular guide face, whereby each time the cutting part of the saws, in the rotation of the latter about the rotor axis, moves into said peripheral recesses, it crops off a section of the bar, whose length depends on the extent to which the rotatable roller is driven by the bar.

2. A cropping machine for cropping bars and the like fed with a continuous movement of translation, comprising a stand, a rotor having an axis and mounted on said stand for rotation about said axis, a number of cutting units carried by said rotor; each of said units comprising a rotary cutting means and individual separately fed driving means for driving said cutting means about an axis orthogonal to said motor axis, a member including an eccentric journal for connection of each one of said cutting units with said rotor whereby the position of said cutting means is adjustable with respect to said rotor, a rotary guide having an annular guide face rotatable about an axis parallel with said rotor axis, means for engaging an advancing bar for being driven thereby and comprising a reaction roller and a rotatable roller engaging the bar therebetween, the rotatable roller being frictionally driven by the bar to be cropped and being operatively connected to said rotor and said rotary guide to drive the same in synchronism about their respective axes, said guide having recesses formed in the periphery thereof for receiving the cutting parts of the cutting means in cycles, the geometric cylinder described by the cutting part of the cutting means in the rotation of the latter about the axis of rotation of the rotor intersecting the annular guide face, whereby each time the cutting part of the cutting means, in the rotation of the latter about the rotor axis, moves into said peripheral recesses, it crops off a section of the bar, whose length depends on the extent to which a measuring element is driven by the bar.

3. A cropping machine according to claim 2 wherein said individual driving means for said cutting means comprises an axle carried by said eccentric journal, an hollow shaft rotatably mounted on said axle and carrying said cutting means, a pneumatic turbine rigidly connected with said shaft and an air blower also rigidly connected to said shaft for regulation of the speed thereof.

4. A cropping machine for cropping bars and the like fed with a continuous movement of translation, comprising a stand, a rotor having an axis and mounted on said stand for rotation about said axis, a number of cutting units carried by said rotor; each of said units comprising a rotary saw and individual separately fed driving means for driving said saw about an axis orthogonal to said motor axis; a rotary guide having an annular guide face rotatable about an axis parallel with said rotor axis, a measuring element comprising a rotatable roller frictionally driven by the bar to be cropped and operatively connected to said rotor and said rotary guide to drive the same in synchronism about their respective axes, said guide having recesses formed in the periphery thereof for receiving the cutting parts of the saws in cycles, the geometric cylinder described by the cutting part of the saws in the rotation of the latter about the axis of rotation of rotor intersecting the annular guide face, whereby each time the cutting part of the saws, in the rotation of the latter about the rotor axis, moves into said peripheral recesses it crops off a section of the bar, whose length depends on the extent to which the measuring element is driven by the bar; the rotor, the rotary guide and the measuring roller being mounted on the stand by pivotal connecting means comprising a plate mounted on the stand to be pivotable about a shaft parallel with the axis of rotation of the measuring roller, a support roller for the bar being rotatably mounted on the stand in alignment with the measuring roller and having its axis of rotation parallel with that of the measuring roller and elastic means for biasing the plate to pivot about the shaft in a direction to urge the measuring roller toward the support roller and thereby grip the bar between the latter and the measuring roller.

5. A cropping machine as claimed in claim 4, further comprising a locking device combined with the elastic means for selectively maintaining the plate in a position for elastically urging the measuring roller toward the support roller and releasing the plate when it is not desired to grip the bar between the rollers.

References Cited by the Examiner

UNITED STATES PATENTS

| 525,211 | 8/94 | Holmes | 83—564 |
|---|---|---|---|
| 955,113 | 4/10 | Bilgram | 83—329 |
| 1,609,158 | 11/26 | Dake | 253—52 |
| 1,690,209 | 11/28 | Smith | 83—329 |
| 1,993,393 | 3/35 | Willshaw | 83—339 |
| 2,836,880 | 6/58 | Chang | 83—329 |
| 2,899,737 | 8/59 | Nilsson | 83—329 |

FOREIGN PATENTS 567,429 2/45 Great Britain.

ANDREW R. JUHASZ, *Primary Examiner.*

CARL W. TOMLIN, *Examiner.*